Nov. 17, 1959  S. G. GILLETTE  2,913,113
METHOD AND APPARATUS FOR SALVAGING METAL ARTICLES
Filed Aug. 30, 1957  5 Sheets-Sheet 4

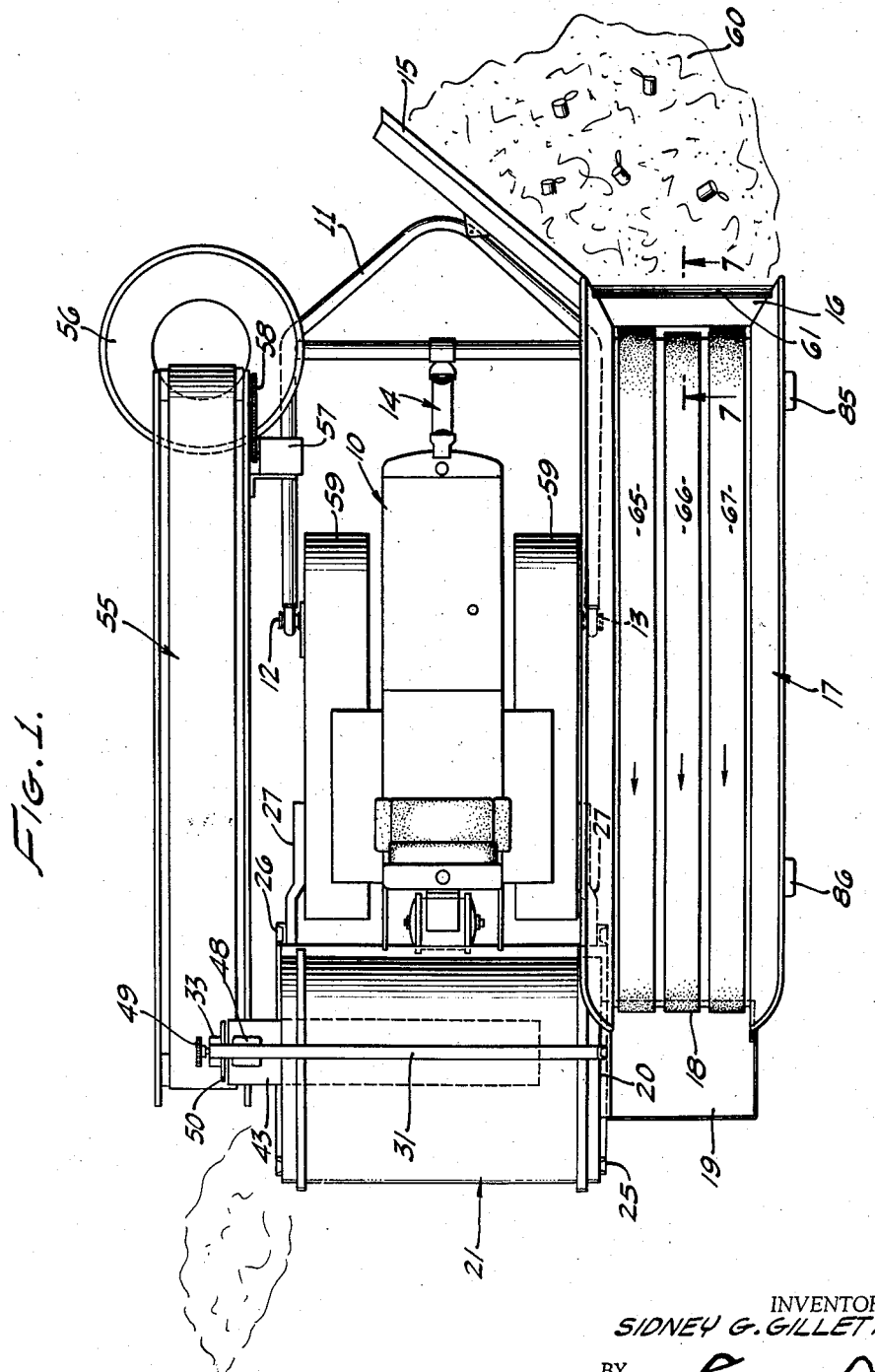

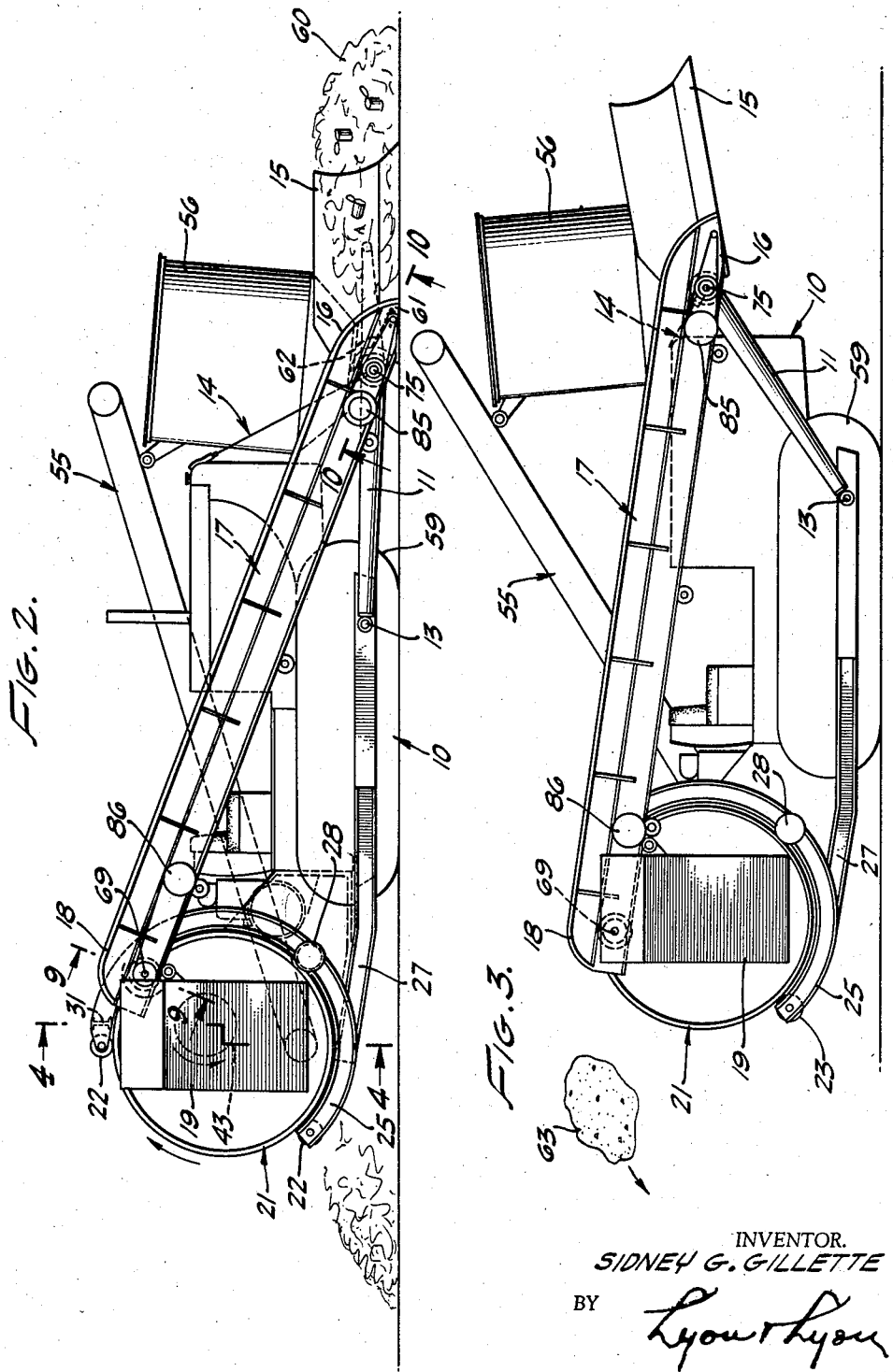

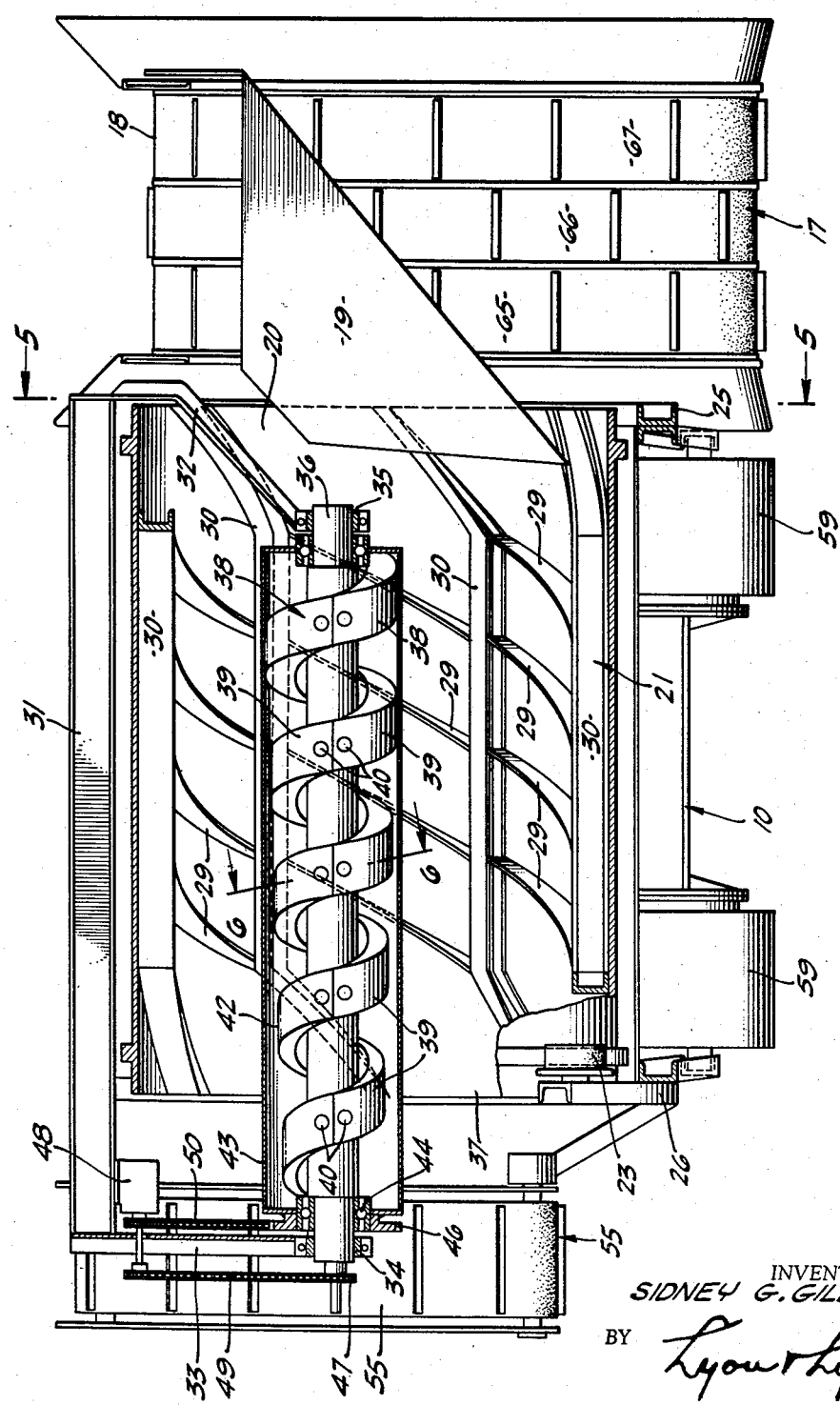

INVENTOR.
SIDNEY G. GILLETTE
BY Lyon & Lyon
ATTORNEYS

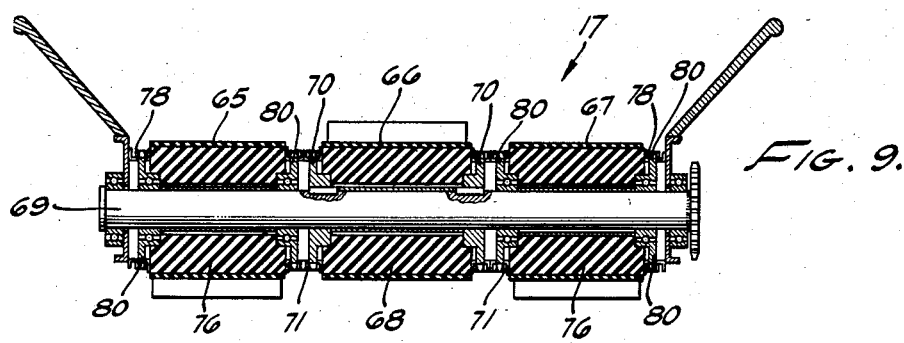
FIG. 9.
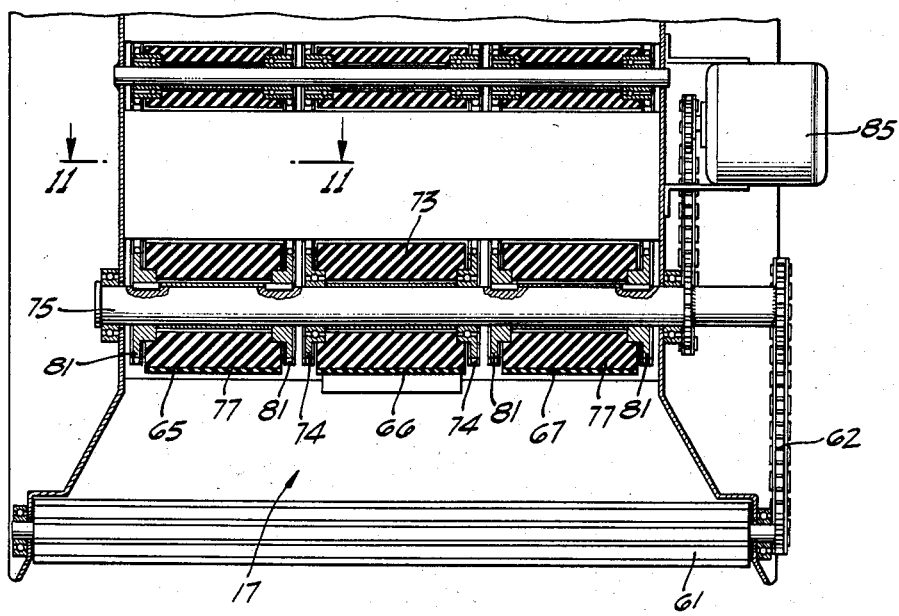
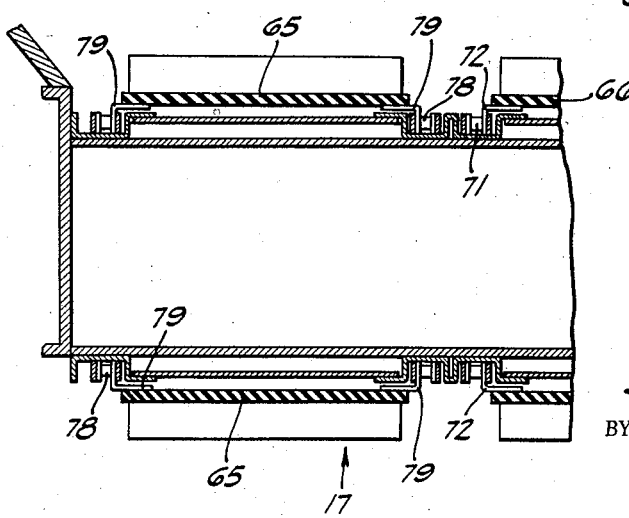
FIG. 10.
FIG. 11

United States Patent Office 2,913,113
Patented Nov. 17, 1959

2,913,113

METHOD AND APPARATUS FOR SALVAGING METAL ARTICLES

Sidney G. Gillette, Alhambra, Calif., assignor to Los Angeles By-Products Co., Los Angeles, Calif., a corporation of California Application August 30, 1957, Serial No. 681,392

11 Claims. (Cl. 209—223)

This invention relates to salvaging metal articles such as tin cans from rubbish of the general type picked up by private and municipal rubbish collectors. Non-combustible rubbish may include tin cans, glass, utensils, toys, ashes and miscellaneous household articles. In certain large cities, air pollution regulations have curtailed the use of backyard incinerators and as a consequence, the combustible and non-combustible rubbish are deposited in cut-and-cover land fill dumps. Furthermore, to save on collection costs, both combustible and non-combustible rubbish as well as garbage, are picked up at the same time and loaded into the same truck. This mixed material is either hauled directly to the dump or to a transfer station where the material is shifted into large semi-trailers for transportation to the dumps.

Although the tin cans present in such a heterogeneous mixture have a recognized salvage value, it is not economically profitable to salvage the tin cans from such mixture by manual methods, owing to the large volumes of material that must be sorted as compared to the relatively small proportion of tin cans present in the mixture.

It is the principal object of this invention to provide a method and apparatus for handling large volumes of mixed rubbish to permit salvage of ferrous materials on a profitable basis. It is another object to provide a method and apparatus for extracting tin cans and other ferrous material from a falling stream of loose mixed rubbish. Another object is to provide apparatus using a novel form of magnet for extracting ferrous material from a falling stream of mixed material. A more particular object is to provide apparatus of this type employing a helical magnet which acts to move ferrous material in a direction generally parallel to the axis of the magnet by means of a non-magnetic rotating shell which encloses the magnet.

Another obejct is to provide a mobile unit which is capable of moving along a windrow of mixed rubbish and to extract ferrous material therefrom and to redeposit the residue on the ground. Other and more detailed objects and advantages will appear hereinafter.

In the drawings:

Figure 1 is a plan view of a mobile unit capable of carrying out the method of my invention and showing a preferred form of apparatus embodying my invention.

Figure 2 is a side elevation thereof, the pick-up head being shown in operating position.

Figure 3 is a view similar to Figure 2 showing the pick-up head in raised inoperative position.

Figure 4 is a sectional elevation taken substantially on the lines 4—4 as shown in Figure 2.

Figure 9 is a sectional view taken substantially on the lines 9—9 as shown in Figure 2.

Figure 10 is a sectional view taken substantially on the lines 10—10 as shown in Figure 2.

Figure 11 is a transverse sectional detail taken substantially on the lines 11—11 as shown in Figure 10.

Figure 5:
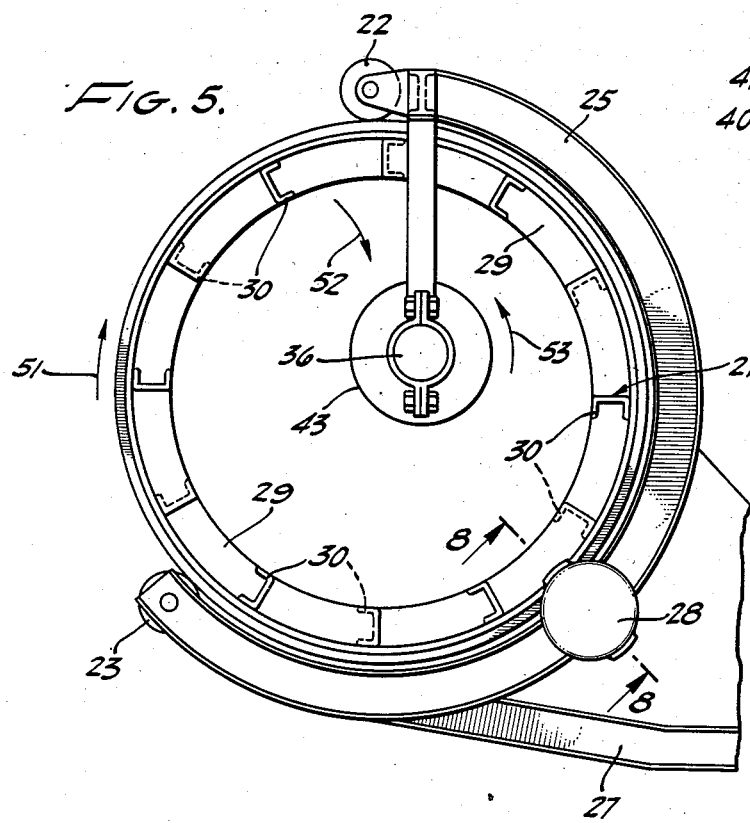
Figure 5 is a sectional side elevation taken substantially on the lines 5—5 as shown in Figure 4.
Figure 6:
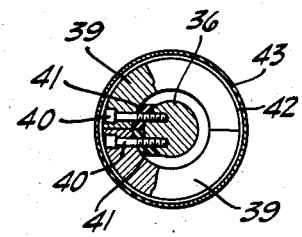
Figure 6 is a sectional detail taken substantially on the lines 6—6 as shown in Figure 4.
Figure 7:
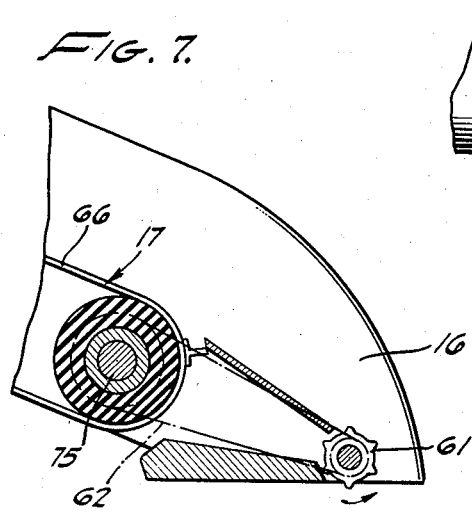
Figure 7 is a sectional side elevation taken on the lines 7—7 as shown in Figure 1.
Figure 8:
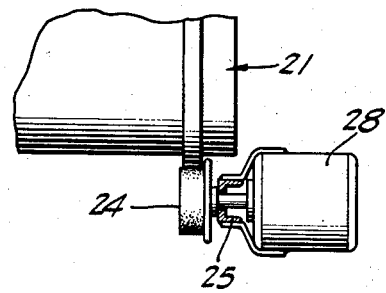
Figure 8 is a detail partly in section taken substantially on the lines 8—8 as shown in Figure 5.

Referring to the drawings, the mobile unit 10 comprises a track-laying tractor of conventional type and this tractor is provided with a lift frame 11 provided to the main frame of the tractor by means of trunnions 13 and 13. The lift frame 11 is raised and lowered by suitable block and tackle mechanism 14 driven from the tractor engine by suitable connections (not shown).

An angled scraper blade 15 is carried on the forward end of the frame 11. This blade is arranged to direct rubbish material into the forward end 16 of the conveyor generally designated 17. As shown in Figure 4, the rearward elevated end 18 of the conveyor 17 discharges into a side delivery chute 19 which in turn discharges into the inlet end 20 of a rotary drum 21 carried on the mobile unit 10. The drum 21 is rotatably supported by means of rollers 22, 23, 24 which engage the outer periphery of the drum. These rollers are mounted on laterally spaced arcuate supports 25 and 26 mounted on stationary brackets 27 attached to the frame of the tractor. The rollers 24 are power driven from the electric or hydraulic motors 28 carried on the arcuate supports 25.

The drum 21 is provided on its inner periphery with a plurality of axially spaced helically inclined fins 29 extending between axially directed ribs 30. The ribs 30 terminate short of each end of the drum 21.

Support structure including transverse beams 31 and brackets 32 and 33 are carried on the supports 25 and 26 and provide bearing supports 34 and 35 for the shaft 36. The axis of the shaft 36 is parallel to the axis of the drum 21 and a major portion of the shaft 36 is enclosed within the outline of the drum. The bearing 35 supported on bracket 32 is positioned near the inlet end 20 of the drum while the bearing 34 is positioned outside the discharge end 37 of the drum and supported by the bracket 33.

A magnet 38 generally helical in form extends axially of the shaft 36 and is formed in a plurality of segments 39 fixed to the shaft by means of threaded fastenings 40 extending through resilient pads 41. The magnet segments are relatively short and are assembled North to North and South to South, with a small gap between them. The inner diameter of the helical magnet member 39 may be substantially constant but I prefer to form the outer diameter 42 of constantly decreasing size. The magnet member 39 thus has the greatest outside diameter near the end 20 of the drum 21 and the smallest outside diameter near the discharge end 37 of the drum 21. A cylindrical shell 43 encloses the magnet member 39 and is mounted on axially spaced bearings 44 and 45 carried on the shaft 36. A drive sprocket 46 is connected to the shell 43 and a similar drive sprocket 47 may be connected to the shaft 36. The sprockets 46 and 47 are driven from the electric motor 48 through chains 49 and 50. The chains may be selectively and independently driven from the motor 48.

Mixed rubbish which is delivered into the rotating drum 21 is caused to travel axially through the drum by the helical fins 29 and is elevated into the upper portion of the drum by means of the axially extending ribs 30. As shown in Figure 5, the drum turns clockwise in the direction of the arrow 51 and rubbish falls from the upper portion of the drum prior to reaching the zenith. The shaft 36 and shell 43 are not located directly above the axis of the drum but are offset slightly to one side so that material falling from the internal periphery of the drum 21 moves in the general direction of the arrow 52 and contacts one side of the sleeve 43 as it rotates counterclockwise in the direction of the arrow 53. Not all of the rubbish contacts the outer surface of the shell 43 but a major portion of it falls closely adjacent thereto and well within the magnetic field of the magnet 39. The free-falling mixed rubbish permits the ferrous materials contained therein to be laterally extracted with a minimum of interference from the remaining material.

The shell 43 is preferably formed of relatively thin non-magnetic material such as, for example, stainless steel. The shell is cylindrical and therefore closer to the outer surface of the helical magnet 39 near the inlet end of the drum 21 than near the outlet end 37. Accordingly, the decrease in outside diameter of the helical magnet 39 decreases the intensity of magnetic attraction as the ferrous material moves in a helical path toward the chains 49 and 50. Consequently, the tin cans and other ferrous material are readily separated from the outer surface of the shell 43 in the vicinity of the chain 50 by the action of following material crowding them from the end of the shell 43.

A conveyor 55 is mounted on the side of the mobile unit opposite the conveyor 18 and this conveyor receives ferrous material delivered from the outer surface of the sleeve 43 and conveys it toward a large receptacle 56 detachably mounted on the lift frame 11. A motor 57, hydraulic or electric, drives the conveyor 55 through chain 58.

In operation, the tractor 10 is driven along the ground by means of the conventional endless tracks 59. Mixed rubbish 60 previously deposited on the ground in the form of a windrow is engaged by the blade 15 and directed into the inlet end 16 of the side conveyor 17 as the tractor 10 moves along the ground. The forward end of the conveyor 17 may be provided with a pickup wheel 61 driven from the forward shaft 75 of the conveyor 17 by chain 62.

Should the conveyor 17 encounter an object too large to be handled by the drum 21, for example, a tree trunk, a piece of masonry or a discarded water heater shell, the forward end of the conveyor 17 may be lifted by raising the frame 11. Lifting of the forward end of the conveyor 17 causes the rearward end 18 to move rearwardly to such an extent that material is no longer delivered into the chute 19 but is by-passed over the top of the chute. As shown in Figure 3, the large piece of rubbish 63 is discharged rearwardly onto the ground and is by-passed around the chute 19 when the blade 15 and forward end 16 of the conveyor 17 are elevated.

It is highly desirable to provide means for separating the rubbish 60 as it is transported by the conveyor 17 to assist in loosening the mass prior to delivery into the chute 19. As shown in the drawings, this purpose is accomplished by providing three separate transporting belts 65, 66 and 67 for the conveyor 17. The center belt 66 is driven at a relatively high speed and the side belts 65 and 67 are driven at a lower speed. In this way, rubbish being transported by the three belts is separated and loosened in the course of being transported. The pulley 68 is mounted on the upper shaft 69 and this shaft drives sprockets 70 which drive parallel chains 71. Brackets 72 connect the chains 71 to the belt 66. The belt 66 passes over the lower pulley 73 which is carried on sprockets 74 freely mounted to turn on the lower shaft 75. The chains 71 each engage aligned sprockets 70 and 74.

The side belts 65 and 67 are each trained over pulleys 76 and 77 and are connected to chains 78 by means of brackets 79. The chains 78 are trained over aligned sprockets 80 and 81. The sprockets 80 are mounted to rotate freely on the upper shaft 69 while the sprockets 81 are fixed to the lower shaft 75. From this description it will be understood that the center belt 66 is driven from the upper shaft 69 while the side belts 65 and 67 are driven from the lower shaft 75. The lower shaft 75 is driven from an electric or hydraulic motor 85 and the upper shaft 69 is driven from a similar motor 86 (see Figure 2).

As the mixed rubbish passes helically through the drum 21, the tin cans and other ferrous material are extracted magnetically in the manner described above and delivered by means of the conveyor 55 into the receptacle 56. The remainder of the material passes out through discharge opening 37 in the end of the drum 31 and falls to the ground in the form of a windrow. This material is subsequently deposited underground by conventional cut-and-cover operations.

Although the magnet 39 is preferably in the form of permanent magnet sections connected together as shown, it is also possible to use electromagnets energized in any convenient fashion from power developed by the tractor engine. The helical shape of the magnet is highly advantageous since it sets up a magnetic field causing tin cans and other ferrous material to progress axially along the outer surface of the shell 43.

Having fully described my invention, it is to be understood that I do not wish to be limited to the details herein set forth, but my application is of the full scope of the appended claims.

I claim:

1. Apparatus for separating ferrous materials from mixed rubbish, comprising in combination, a rotary drum, means for continuously feeding mixed rubbish into one end of the drum, a magnetic device positioned within the drum including a sleeve, an axially extending generally helical magnet member within said sleeve, said sleeve and magnet member being mounted off-center with respect to the drum axis, means within the drum for elevating the mixed rubbish and permitting it to fall freely in the vicinity of the magnetic device whereby ferrous materials are attracted laterally to the sleeve of said device from the free-falling mixed rubbish, and means for rotating said helical magnet within said sleeve to effect continuous movement of such ferrous materials longitudinally to a position outside the drum.

2. Apparatus for separating ferrous materials from mixed rubbish, comprising in combination, a rotary drum having internal ribs, means for introducing mixed rubbish into one end of the drum, a magnetic device positioned within the drum and extending in a direction parallel to the drum axis, the ribs within the drum acting to elevate the mixed rubbish and permit it to fall freely in the vicinity of the magnetic device, whereby ferrous materials are attracted laterally to the device from the free-falling rubbish, the magnetic device including a segmental helical member enclosed within a non-magnetic shell member, and means for rotating at least one of said members to cause axial movement of the ferrous material.

3. The combination set forth in claim 2 wherein the shell member is rotated.

4. The combination set forth in claim 2 wherein the helical member is rotated.

5. The combination set forth in claim 2 in which both the shell member and the helical member are rotated.

6. The combination as set forth in claim 2 wherein the magnetic device is in generally helical form, one end having a larger outside diameter than the other end.

7. A magnetic device including a segmental magnet member in generally helical form, one end having a larger outside diameter than the other end, and a generally cylindrical non-magnet shell enclosing the magnet member and coaxial therewith.

8. Salvage apparatus for separating ferrous materials from mixed rubbish, comprising in combination: a mobile unit, a conveyor on one side of said unit having means for picking up mixed rubbish from a windrow, a rotary drum on said mobile unit, means for feeding mixed rubbish from said conveyor into one end of the drum, magnetic separator means within the drum for extracting ferrous materials, means on the other side of the mobile unit receiving ferrous materials so extracted, the drum having an opening on the other end thereof through which the residue of the mixed rubbish is discharged.

9. Salvage apparatus for separating ferrous materials from mixed rubbish comprising in combination: a mobile unit, a conveyor on one side of said unit having means for picking up mixed rubbish from a windrow, a chute at one end of the drum receiving mixed rubbish discharged by said conveyor, a rotary drum on said mobile unit receiving mixed rubbish from said chute, magnetic separator means within the drum for extracting ferrous materials, a second conveyor on the other side of the mobile unit receiving ferrous materials so extracted, the drum having an opening on the opposite end from the chute through which the residue of the mixed rubbish is discharged.

10. The combination set forth in claim 9 wherein the first named conveyor is movably mounted upon the mobile unit so that upward movement of the forward end of the conveyor serves to misalign its rearward end with respect to said chute.

11. Salvage apparatus for separating ferrous materials from mixed rubbish, comprising in combination: a tractor having a pivoted frame thereon, a conveyor on one side of said tractor having means for picking up mixed rubbish from a windrow, the forward end of the conveyor being attached to said frame, a chute on the tractor receiving mixed rubbish discharged by said conveyor, a rotary drum on the tractor at the rear thereof receiving mixed rubbish from said chute, magnetic separator means within the drum for extracting ferrous materials, upward movement of the frame and forward end of the conveyor serving to move the rear end of the conveyor rearwardly and out of alignment with respect to said chute.

References Cited in the file of this patent
UNITED STATES PATENTS

| | | |
|---|---|---|
| 867,744 | McCabe | Oct. 8, 1907 |
| 1,371,825 | Uhlig | Mar. 15, 1921 |
| 2,786,439 | Young | Mar. 26, 1957 |